(12) United States Patent
Gerrard

(10) Patent No.: US 11,386,913 B2
(45) Date of Patent: Jul. 12, 2022

(54) AUDIO OBJECT CLASSIFICATION BASED ON LOCATION METADATA

(71) Applicant: DOLBY LABORATORIES LICENSING CORPORATION, San Francisco, CA (US)

(72) Inventor: Mark William Gerrard, Rozelle (AU)

(73) Assignee: Dolby Laboratories Licensing Corporation, San Francisco, CA (US)

(*) Notice: Subject to any disclaimer, the term of this patent is extended or adjusted under 35 U.S.C. 154(b) by 223 days.

(21) Appl. No.: 16/636,241

(22) PCT Filed: Jul. 26, 2018

(86) PCT No.: PCT/US2018/043980
§ 371 (c)(1),
(2) Date: Feb. 3, 2020

(87) PCT Pub. No.: WO2019/027812
PCT Pub. Date: Feb. 7, 2019

(65) Prior Publication Data
US 2020/0381003 A1    Dec. 3, 2020

Related U.S. Application Data

(60) Provisional application No. 62/539,599, filed on Aug. 1, 2017.

(30) Foreign Application Priority Data

Aug. 1, 2017 (EP) .................................. 17184244

(51) Int. Cl.
*G10L 21/0272* (2013.01)
*G06F 16/687* (2019.01)
(Continued)

(52) U.S. Cl.
CPC ........ *G10L 21/0272* (2013.01); *G06F 16/635* (2019.01); *G06F 16/65* (2019.01); *G06F 16/683* (2019.01); *G06F 16/687* (2019.01)

(58) Field of Classification Search
CPC ..... G10L 21/0272; G10L 25/78; G10L 25/51; G10L 25/03; G10L 19/008; G10L 19/00;
(Continued)

(56) References Cited

U.S. PATENT DOCUMENTS 7,480,386 B2 *  1/2009  Ogata ..................... G10L 21/00
                                                          381/310
7,894,654 B2 *  2/2011  Hirota .................... G10L 21/04
                                                          704/216

(Continued)

FOREIGN PATENT DOCUMENTS

CN    101697591    4/2010
CN    104217729    12/2014
(Continued)

OTHER PUBLICATIONS

Fitzgerald, D. et al "Projection-Based Demixing of Spatial Audio" IEEE/ACM Transactions on Audio, Speech, and Language Processing, vol. 24, No. 9, Sep. 2016, pp. 1560-1572.
(Continued)

*Primary Examiner* — Linda Wong

(57) ABSTRACT

Methods (700, 800, 900), systems (200, 300, 400, 500, 600) and computer program products are provided. Location metadata (620) associated with an audio object is received (801). The location metadata defines a position of the audio object in an audio scene. It is estimated (630, 802), based on the location metadata, whether the audio object includes dialog. A value representative of a result of the estimation is assigned (803) to an object type parameter (231). In some example embodiments, audio objects are selected (661, 662, 804) based on values of their respective of object type
(Continued)

parameters. In some example embodiments, at least one of the selected audio objects is submitted to dialog enhancement (690, 807).

14 Claims, 10 Drawing Sheets

(51) Int. Cl.
*G06F 16/65* (2019.01)
*G06F 16/683* (2019.01)
*G06F 16/635* (2019.01)

(58) Field of Classification Search
CPC ......... G10L 15/20; G10L 15/00; G10L 15/08;
G10L 15/04; G10L 2015/025; G10L 2021/0135; G10L 25/93; G10L 2015/226; G10L 21/00; G06F 16/635; G06F 16/65; G06F 16/683; G06F 16/687; G06F 3/167; G06F 16/35; G06F 16/3329; G06F 16/285; G06F 16/90332

See application file for complete search history.

(56) References Cited

U.S. PATENT DOCUMENTS

| | | | |
|---|---|---|---|
| 8,682,666 B2 * | 3/2014 | Degani | G10L 15/1807 704/243 |
| 9,349,384 B2 * | 5/2016 | Gunawan | H03G 3/32 |
| 10,335,688 B2 * | 7/2019 | Dauphiny | A63F 13/73 |
| 2001/0010037 A1 * | 7/2001 | Imai | G10L 25/78 704/210 |
| 2007/0025538 A1 | 2/2007 | Jarske | |
| 2007/0083364 A1 | 4/2007 | Wu | |
| 2008/0167864 A1 | 7/2008 | Faller | |
| 2010/0014692 A1 | 1/2010 | Schreiner | |
| 2010/0121634 A1 | 5/2010 | Muesch | |
| 2011/0040395 A1 * | 2/2011 | Kraemer | H04R 3/12 700/94 |
| 2011/0046759 A1 | 2/2011 | Kim | |
| 2011/0112836 A1 * | 5/2011 | Kurki-Suonio | H04M 3/42221 704/235 |
| 2012/0022869 A1 * | 1/2012 | Lloyd | G10L 15/30 704/244 |
| 2013/0297313 A1 * | 11/2013 | Lloyd | G10L 15/30 704/255 |
| 2014/0133683 A1 | 5/2014 | Robinson | |
| 2014/0278392 A1 * | 9/2014 | Ramabadran | G10L 15/20 704/233 |
| 2015/0019218 A1 * | 1/2015 | Yassa | G10L 25/87 704/236 |
| 2015/0206544 A1 * | 7/2015 | Carter | G10L 25/87 704/235 |
| 2015/0221319 A1 | 8/2015 | Cartwright | |
| 2015/0332680 A1 | 11/2015 | Crockett | |
| 2015/0380054 A1 * | 12/2015 | Vilermo | G10L 21/055 386/201 |
| 2016/0044433 A1 * | 2/2016 | Tsingos | H04S 3/002 381/307 |
| 2016/0056787 A1 | 2/2016 | Lu | |
| 2016/0078879 A1 | 3/2016 | Lu | |
| 2016/0180839 A1 * | 6/2016 | Tomita | G10L 15/05 704/240 |
| 2016/0203828 A1 * | 7/2016 | Gomez | G10L 15/20 704/226 |
| 2016/0247518 A1 | 8/2016 | Schuller | |
| 2017/0098452 A1 | 4/2017 | Tracey | |
| 2017/0309296 A1 * | 10/2017 | Sun | H04N 21/440281 |
| 2018/0018986 A1 * | 1/2018 | Zass | G10L 17/26 |
| 2018/0048943 A1 * | 2/2018 | Melkote | H04N 21/440281 |
| 2018/0115850 A1 * | 4/2018 | De Burgh | H04S 3/008 |
| 2020/0058289 A1 * | 2/2020 | Gabryjelski | G10L 17/00 |
| 2021/0142796 A1 * | 5/2021 | Saito | G10L 15/07 |

FOREIGN PATENT DOCUMENTS

| | | | | |
|---|---|---|---|---|
| CN | 104882145 A | * | 9/2015 | ......... G10L 19/022 |
| EP | 0743633 B1 | * | 2/2007 | ......... G10L 21/04 |
| EP | 1643769 | | 12/2009 | |
| JP | 2013502184 A | * | 1/2013 | ......... G10L 19/24 |
| JP | 5635097 B2 | * | 12/2014 | ......... G10L 19/00 |
| WO | 2015035492 | | 3/2015 | |
| WO | 2015086895 | | 6/2015 | |
| WO | 2015150066 | | 10/2015 | |
| WO | 2016050899 | | 4/2016 | |
| WO | 2016130885 | | 8/2016 | |
| WO | 2016172111 | | 10/2016 | |

OTHER PUBLICATIONS

Lopatka, K. et al "Improving Listeners Experience for Movie Playback through Enhancing Dialogue Clarity in Soundtracks" Digital Signal Processing, vol. 48, Jan. 1, 2016, pp. 40-49.

Mahana, P. et al "Comparative Analysis of Machine Learning Algorithms for Audio Signals Classification" International Journal of Computer Science and Network Security, vol. 15, No. 6, Jun. 2015.

* cited by examiner

AUDIO OBJECT CLASSIFICATION BASED ON LOCATION METADATA

CROSS-REFERENCE TO RELATED APPLICATION

This application claims the benefit of priority to U.S. Provisional Application No. 62/539,599 and European Patent Application No. 17184244.6, both filed on 1 Aug. 2017, which are incorporated herein by reference.

TECHNICAL FIELD

The present disclosure generally relates to the field of audio processing, and more specifically to methods, apparatuses and systems that classify audio objects based upon location metadata.

BACKGROUND

Different types of multichannel audio formats may be employed to reproduce an audio scene. The different audio channels may for example be intended to be played back by respective loudspeakers for together reproducing the audio scene. Audio channels are typically associated with a certain position in space, or with a certain loudspeaker (such as a left, right or center speaker). In recent years, audio formats have been introduced in which the traditional audio channels are supplemented (or even replaced) by audio objects which are associated with time-variable spatial positions. An audio object typically comprises audio content and associated location metadata. While the audio content represents the actual audio signal (or the actual audio stream), the location metadata defines a position of the audio object in an audio scene. Many different audio processing systems have been proposed for coding, decoding, or rendering of audio represented via such audio formats. A desirable property for such audio formats and audio processing systems is to enable faithful reconstruction of an original audio scene. It is therefore desirable to avoid or mitigate coding artefacts or other artefacts caused by audio processing systems and/or audio reproduction systems. Other desirable properties may for example include bitrate efficiency and/or computational efficiency. However, it is often difficult to provide high bitrate efficiency and/or high computational efficiency while still providing a faithful reconstruction without audible artefacts. One approach for making a suitable tradeoff between these sometimes conflicting properties is to treat different types of audio signals differently.

As an example, the document US 2016/0078879 A1 (which is incorporated herein by reference in its entirety) discloses apparatuses and methods for classifying and processing audio signals. An audio classifier classifies an audio signal into at least one audio type in real time. An audio improving device processes the audio signal for improving a listening experience of an audience. An adjusting unit adjusts at least one parameter of the audio improving device in a continuous manner based on a confidence value of the at least one audio type. In one example implementation, the audio improving unit employs dialog enhancement when speech is present in the audio signal, and the dialog enhancement is turned off when speech is absent in the audio signal.

As another example, the document US 2015/0332680 A1 (which is incorporated herein by reference in its entirety) discloses a method in which perceptual importance of audio objects is determined, and in which the audio objects are clustered based on their perceptual importance. This document also discloses an audio classification component which employs a set of pre-trained models representing statistical properties of respective target audio types (such as dialog, music, sound effects and noise) to compute confidence scores for each target audio type, and estimates the best matched audio types. The confidence scores are computed using different machine learning methods.

As a further example, the document US 2010/0121634 A1 (which is incorporated herein by reference in its entirety) discloses methods and apparatus for speech enhancement in entertainment audio. In one implementation, the entertainment audio is analyzed to classify time segments of the audio as being either speech or other audio. Speech enhancement is applied to time segments classified as speech.

However, it would still be desirable to provide new systems and methods for addressing one or more of the above mentioned issues.

BRIEF DESCRIPTION OF THE DRAWINGS

Example embodiments will now be described with reference to the accompanying drawings, on which.

All the figures are schematic and generally only show parts which are necessary in order to elucidate the disclosure, whereas other parts may be omitted or merely suggested. Unless otherwise indicated, like reference numerals refer to like parts in different figures.

DETAILED DESCRIPTION

Figure 1:
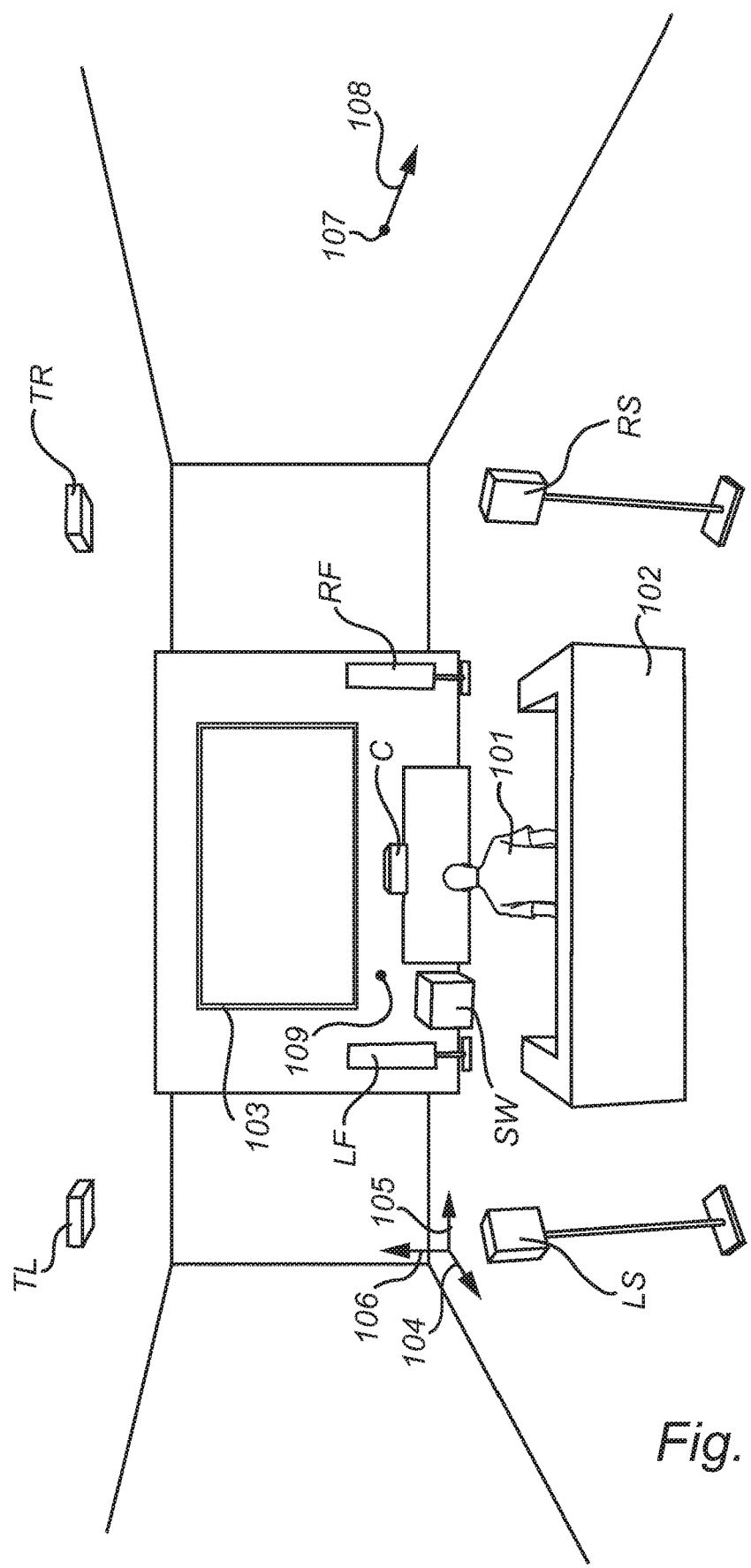
FIG. 1 is a perspective view of a room with an example loudspeaker setup for reproducing an audio scene.

As used herein, an audio signal may be a pure audio signal, an audio part of an audiovisual signal or multimedia signal, or any of these in combination with metadata.

As used herein, a channel is an audio signal associated with a predefined/fixed spatial position/orientation or an undefined spatial position such as "left" or "right".

As used herein, an audio object or audio object signal is an audio signal associated with a spatial position susceptible of being time-variable, in other words a spatial position whose value may be re-assigned or updated over time.

I. OVERVIEW

According to a first aspect, example embodiments provide a method. The method comprises receiving location metadata associated with an audio object. The location metadata defines a position of the audio object in an audio scene. The method further comprises estimating, based on the location metadata, whether the audio object includes dialog, and assigning a value to an object type parameter representative of a result of the estimation.

Schemes for classifying audio objects are known in the art. Examples of such schemes are disclosed in the documents US 2016/0078879 A1 (which is incorporated herein by reference in its entirety), US 2015/0332680 A1 (which is incorporated herein by reference in its entirety) and US 2010/0121634 A1 (which is incorporated herein by reference in its entirety) which are also mentioned in the background section. However, such known schemes for classifying audio objects are based on analysis of the actual audio content of the audio objects. Such analysis may be of high computational complexity, especially if there are many audio objects in the audio scene, and if the classification is supposed to be performed in real time. An audio scene may for example include dozens, or even more than a hundred audio objects. Analyzing the location metadata of the audio objects is less computationally demanding, and may still provide an estimate of whether the audio object includes dialog. This may be useful in MCPS (millions of clock cycles per second) sensitive applications, such as embedded DSP (digital signal processing) solutions.

It will be appreciated that an audio object which includes dialog may for example include speech or voice content.

According to some example embodiments, the object type parameter may indicate a level of confidence that the audio object includes dialog.

The object type parameter may for example be a number (for example a float number). A high value of the object type parameter may for example indicate a high confidence that the audio object includes dialog, and a low value of the object type parameter may for example indicate that the audio object is less likely to include dialog. Alternatively, a low value of the object type parameter may for example indicate a high confidence that the audio object includes dialog, and a high value of the object type parameter may for example indicate that the audio object is less likely to include dialog.

According to some example embodiments, the object type parameter may be a Boolean type parameter indicating whether or not a level of confidence that the audio object includes dialog is above (or exceeds) a threshold.

The object type parameter being zero may for example indicate that the confidence level is below the threshold, and the object type parameter being one may for example indicate that the confidence level is above (or exceeds) the threshold. Alternatively, the object type parameter being one may for example indicate that the confidence level is below the threshold, and the object type parameter being zero may for example indicate that the confidence level is above (or exceeds) the threshold.

According to some example embodiments, the estimation may be performed based on a position of the audio object in a front-back direction of the audio scene. The position in the front-back direction may be defined by the location metadata.

Audio objects including dialog are often located at the front of the audio scene. An audio object located at the back of the audio scene may be less likely to include dialog.

It will be appreciated that the front of the audio scene may be in front of an intended listener, and the back of the audio scene may be behind the intended listener. The front of the audio scene may for example be a position associated with a screen (such as a movie/cinema screen or TV screen) at which images (for example in the form of a video stream) associated with the audio scene are supposed to be displayed. Audio objects including dialog may for example be located at the screen, or at the edge of the screen.

According to some example embodiments, estimating whether the audio object includes dialog may comprise associating a position at a front of the audio scene with a higher level of confidence that the audio object includes dialog than levels of confidence associated with positions further back in the audio scene. In other words, an audio object with a position at the front of the audio scene may be assigned (or attributed) a higher confidence level that it includes dialog than confidence levels assigned (or attributed) to audio objects located further back in the audio scene. In other words, if the position of an audio object moves backwards in the audio scene, the confidence level that the audio object incudes dialog may decrease. It will be appreciated that other factors may also influence the estimation whether an audio object includes dialog, and that the confidence level may therefore decrease even if an audio object moves towards the front of the audio scene.

According to some example embodiments, estimating whether the audio object includes dialog may comprise computing a speed (or velocity) of the audio object based on location metadata associated with different time frames, and estimating, based on the speed (or velocity), whether the audio object includes dialog.

Audio objects including dialog often do not move around that much in the audio scene. Objects only including dialog may for example be stationary in the audio scene. An audio object moving rapidly (or with high speed) in the audio scene may be less likely to include dialog.

According to some example embodiments, estimating whether the audio object includes dialog may comprise associating a first value of the speed with a higher level of confidence that the audio object includes dialog than a level of confidence associated with a second value of the speed. The first value of the speed may be lower than the second value of the speed. In other words, an audio object with a low (or zero) speed may be assigned (or attributed) a higher confidence level that it includes dialog than confidence levels assigned (or attributed) to audio objects with higher speed. In other words, if the speed of an audio object increases, the confidence level that the audio object incudes dialog may decrease. It will be appreciated that other factors may also influence the estimation whether an audio object includes dialog, and that the confidence level may therefore decrease even if the speed of the audio object decreases.

According to some example embodiments, estimating whether the audio object includes dialog may comprise computing an acceleration of the audio object based on location metadata associated with different time frames, and estimating, based on the acceleration, whether the audio object includes dialog.

An audio objects with high/large acceleration may be less likely to include dialog than audio objects with low/small (or zero) acceleration. Estimating whether the audio object includes dialog may for example comprise associating a first value of the acceleration with a higher level of confidence that the audio object includes dialog than a level of confidence associated with a second value of the acceleration. The first value of the acceleration may for example be lower than the second value of the acceleration. In other words, an audio object with a low (or zero) acceleration may for example be assigned (or attributed) a higher confidence level that it includes dialog than confidence levels assigned (or attributed) to audio objects with higher acceleration. In other words, if the acceleration of an audio object increases, the confidence level that the audio object incudes dialog may for example decrease. It will be appreciated that other factors may also influence the estimation whether an audio object includes dialog, and that the confidence level may therefore decrease even if the acceleration of the audio object decreases.

According to some example embodiments, the estimation may be performed based on a level of elevation of the audio object defined by the location metadata.

Audio objects including dialog are often located at an intended listener level, or at a floor level. An audio object located at an elevated position above the intended listener in the audio scene is often less likely to include dialog.

According to some example embodiments, estimating whether the audio object includes dialog may comprise associating a first level of elevation of the audio object with a higher level of confidence that the audio object includes dialog than levels of confidence associated with other levels of elevation of the audio object. The first level of elevation may correspond to a floor level of the audio scene or a vertical position of an intended listener. In other words, an audio object having a similar vertical position as an intended listener (or being located at a floor level) may be assigned (or attributed) a higher confidence level that it includes dialog than confidence levels assigned (or attributed) to audio objects located higher up or down in the audio scene. In other words, if the audio object moves away from the intended vertical position of the listener (or from the floor level of the audio scene), the confidence level that the audio object incudes dialog may for example decrease. It will be appreciated that other factors may also influence the estimation whether an audio object includes dialog, and that the confidence level may therefore decrease even the audio object moves closer to the intended vertical position of the listener.

According to some example embodiments, estimating whether the audio object includes dialog may comprise computing a linear combination (or a weighted sum) of at least a position of the audio object, and a speed of the audio object.

It will be appreciated that some terms of the linear combination (or weighted sum) may for example be assigned negative sign while other terms may be assigned positive sign.

According to some example embodiments, the method may comprise setting initial coefficients for respective terms in the linear combination (or weighted sum), estimating, using the linear combination, whether a plurality of audio objects include dialog, and adjusting coefficients for respective terms in the linear combination based on the estimations and based on knowledge of whether the respective audio objects actually include dialog. In this way, the coefficients in the linear combination may be tuned for improving the reliability (or accuracy) of the estimation.

According to some example embodiments, the method may comprise receiving a plurality of audio objects. Each of the received audio objects may include audio content and location metadata. The location metadata of an audio object (for example each of the received audio objects) may define a position of that audio object in an audio scene. The method may comprise estimating, based on the location metadata of the respective audio objects, whether the respective audio objects include dialog, assigning values to object type parameters representative of results of the respective estimations, and selecting a subset of the plurality of audio objects based on the assigned values of the object type parameters. The subset may include one or more audio objects.

The selected subset may for example include those audio objects which are most likely to include dialog.

According to some example embodiments, the assigned value for each of the object type parameters may indicate a level of confidence that the corresponding audio object includes dialog. Selecting a subset of the plurality of audio objects may comprise selecting those one or more audio objects for which the level of confidence that the corresponding audio object includes dialog is above a threshold.

According to some example embodiments, the method may comprise subjecting at least one audio object in the selected subset to dialog enhancement.

Dialog enhancement may for example be applied to clarify or increase intelligibility of a dialog (or of speech) for making the dialog easier to hear and understand. Several different ways to enhance dialog (or speech) are known in the art. Examples of ways to enhance dialog may for example be found in paragraph [0208] of US 2016/0078879 A1 (which is incorporated herein by reference in its entirety), and in paragraphs [0027]-[0028] in US 2010/0121634 A1 (which is incorporated herein by reference in its entirety).

According to some example embodiments, the method may comprise performing clustering such that the audio content from those of the plurality of audio objects outside the selected subset is included in a collection of clusters and such that at least one audio object of the selected subset is excluded from the clustering or the audio content of at least one audio object of the selected subset is included in a cluster which does not include audio content from any of those of the plurality of audio objects outside the selected subset (or which only includes audio content from audio objects in the selected subset).

While clustering may be an efficient way to reduce the complexity of an audio scene with many audio objects (for example to improve bitrate efficiency for transmission between an encoder side and a decoder side), dialog may be perceived as so important that it should be kept separate from other audio objects. Therefore, it may be desirable to exclude dialog audio objects from the clustering, or to cluster dialog audio objects separately from the audio objects not including dialog.

Several different clustering schemes are known in the art. The clustering may for example be based on the location metadata. Audio objects which are located close together in the audio scene may for example be combined into the same cluster during the clustering.

According to some example embodiments, the method may comprise, for each of the one or more audio objects in the selected subset, analyzing the audio content of the audio object and determining, based on the analysis, a value indicating a level of confidence that the audio object includes dialog.

Compared to the object type parameter (which is obtained based on the location metadata), analysis of the audio content of an audio object may provide a more reliable estimation of whether the audio object includes dialog. The confidence level obtained via analysis of the audio content of an audio object may therefore be referred to as a refined confidence level. Since analysis of the audio content of a large number of audio objects may have high computational complexity, it may be advantageous to employ the object type parameters (which are obtained based on the location metadata of the audio objects) to reduce the number of audio objects to be subjected to such audio content analysis.

The analysis of the audio content may for example include spectral flux detection, and/or use of a machine learning algorithm. The documents US 2016/0078879 A1 (which is incorporated herein by reference in its entirety, see in particular paragraphs [0405], [0431] and [0443] therein), US 2015/0332680 A1 (which is incorporated herein by reference in its entirety) and US 2010/0121634 A1 (which is incorporated herein by reference in its entirety, see in particular paragraph [0021] therein) referred to in the background section also provide examples of ways to analyze audio content to estimate whether an audio signal includes dialog (or speech).

According to some example embodiments, the method may comprise subjecting at least one audio object from the selected subset to dialog enhancement. The degree of dialog enhancement to which the at least one audio object is subjected may be determined based on the corresponding at least one determined value.

If for example an audio object appears to include dialog "polluted" by plenty of other audio content, a high degree of dialog enhancement may for example be applied to that audio object to make the dialog in that audio object easier to hear and/or distinguish.

The degree of dialog enhancement may for example be time-dependent and/or frequency-dependent.

According to some example embodiments, the selected subset may include multiple audio objects. The method may comprise selecting at least one audio object from the selected subset based on the determined values, and subjecting the selected at least one audio object to dialog enhancement.

The object type parameter may for example indicate that an audio object includes dialog, but a closer analysis of the audio content of the audio object may reveal that the audio object in fact does not include dialog. Dialog enhancement may therefore be omitted for such an audio object.

According to some example embodiments, the selected subset may include multiple audio objects. The method may comprise selecting at least one audio object from the selected subset based on the determined values, and performing the clustering such that the audio content from those of the plurality of audio objects outside the selected at least one audio object is included in a collection of clusters. The clustering may be performed such that the at least one selected audio object is excluded from the clustering or the audio content of the at least one selected audio object is included in a cluster which does not include audio content from any of those of the plurality of audio objects outside the at least one selected audio object (or which only includes audio content from the at least one selected audio object).

The object type parameter may for example indicate that an audio object includes dialog, but a closer analysis of the audio content of the audio object may reveal that the audio object in fact does not include dialog. Such an audio object may therefore be included in the clustering just like the other audio objects not including dialog, while the audio objects actually including dialog may be excluded from the clustering or may be clustered separately.

According to some example embodiments, the method may comprise outputting a bitstream. For at least one audio object (or for each of the received audio objects), the bitstream may include the audio content, the location metadata, and the assigned valued of the object type parameter (which is determined based on the location metadata of the audio object).

According to some example embodiments, the method may comprise outputting a bitstream. For an audio object in the selected subset (or for each audio object in the selected subset), the bitstream may comprise the audio content, the location metadata, and the determined value (which is determined based on analysis of the audio content of the audio object) indicating a level of confidence that the audio object includes dialog.

According to a second aspect, example embodiments provide a computer program product comprising a computer-readable medium with instructions for performing the method of any of the example embodiments of the first aspect. The computer-readable medium may for example be a non-transitory computer-readable medium.

According to a third aspect, example embodiments provide a system configured to receive location metadata associated with an audio object. The location metadata defines a position of the audio object in an audio scene. The system comprises a processing section configured to estimate, based on the location metadata, whether the audio object includes dialog, and to assign a value to an object type parameter representative of a result of the estimation.

The system (or the processing section comprised therein) may for example be configured to perform the method of any of the example embodiments of the first aspect.

According to some example embodiments, the system may be configured to receive a plurality of audio objects. Each of the audio objects may include audio content and location metadata. The location metadata of the audio objects may define positions of the respective audio objects in an audio scene. The processing section may be configured to estimate, based on the respective location metadata, whether the respective audio objects include dialog, and assign values to object type parameters representative of results of the respective estimations. The system may further comprise a selection section configured to select a subset of the plurality of audio objects based on the assigned values of the object type parameters. The subset may include one or more audio objects.

According to some example embodiments, the system may comprise a dialog enhancement section configured to subject at least one audio object in the selected subset to dialog enhancement.

According to some example embodiments, the system may comprise a clustering section configured to perform clustering such that the audio content from those of the plurality of audio objects outside the selected subset is included in a collection of clusters and such that at least one audio object of the selected subset is excluded from the clustering or the audio content of at least one audio object of the selected subset is included in a cluster which does not include audio content from any of those of the plurality of audio objects outside the selected subset.

According to some example embodiments, the system may comprise an analysis section. For each of the one or more audio objects in the selected subset, the analysis section may be configured to analyze the audio content of the audio object and determine, based on the analysis, a value indicating a level of confidence that the audio object includes dialog.

According to some example embodiments, the system may comprise a dialog enhancement section configured to subject at least one audio object in the selected subset to dialog enhancement. The dialog enhancement section may be configured to determine a degree of dialog enhancement to which to subject the at least one audio object based on the corresponding at least one determined value.

According to some example embodiments, the system may comprise a dialog enhancement section configured to subject at least one audio object in the selected subset to dialog enhancement. The selected subset may include multiple audio objects. The at least one audio object to be subjected to dialog enhancement may be selected (for example by a second selection section, which may for example be comprised in the system) based on the determined values.

According to some example embodiments, the system may comprise a second selection section configured to select at least one audio object from the selected subset based on the determined values. The clustering section may be configured to performing the clustering such that the audio content from those of the plurality of audio objects outside the selected at least one audio object is included in a collection of clusters. The clustering section may be configured to perform the clustering such that the at least one selected audio object (that is, the at least one audio object selected based on the determined values) is excluded from the clustering or the audio content of the at least one selected audio object is included in a cluster which does not include audio content from any of those of the plurality of audio objects outside the at least one selected audio object.

According to some example embodiments, the system may comprise an output section configured to output a bitstream. For at least one audio object (or for each of the received audio objects), the bitstream may include the audio content, the location metadata, and the assigned value of the object type parameter.

According to some example embodiments, the system may comprise an output section configured to output a bitstream. For at least one audio object of the selected subset (or for each audio object of the selected subset), the bitstream may include the audio content, the location metadata, and the determined value indicating a level of confidence that the audio object includes dialog.

It is noted that example embodiments include all combinations of features, even if recited in mutually different claims.

II. EXAMPLE EMBODIMENTS

Figure 10:
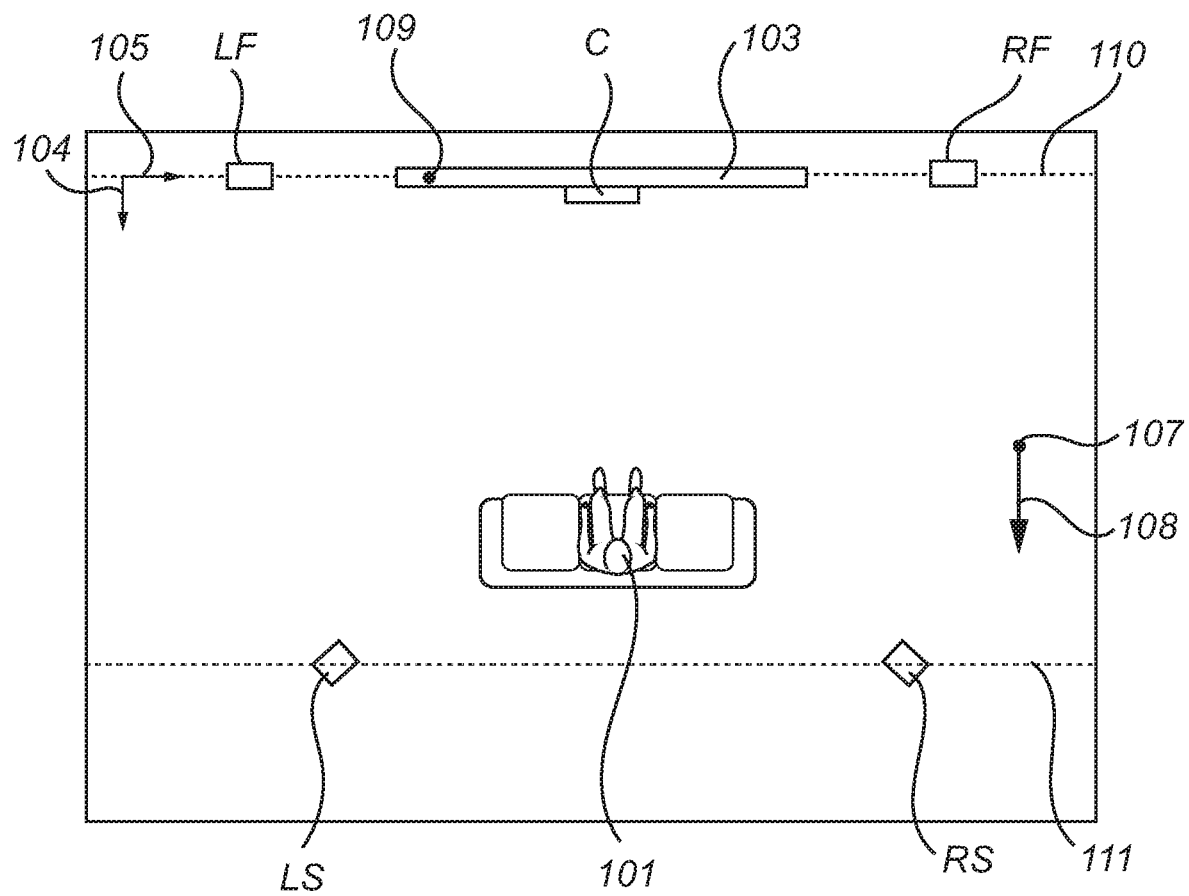
FIG. 10 is a top view of the room in FIG. 1.
Figure 11:
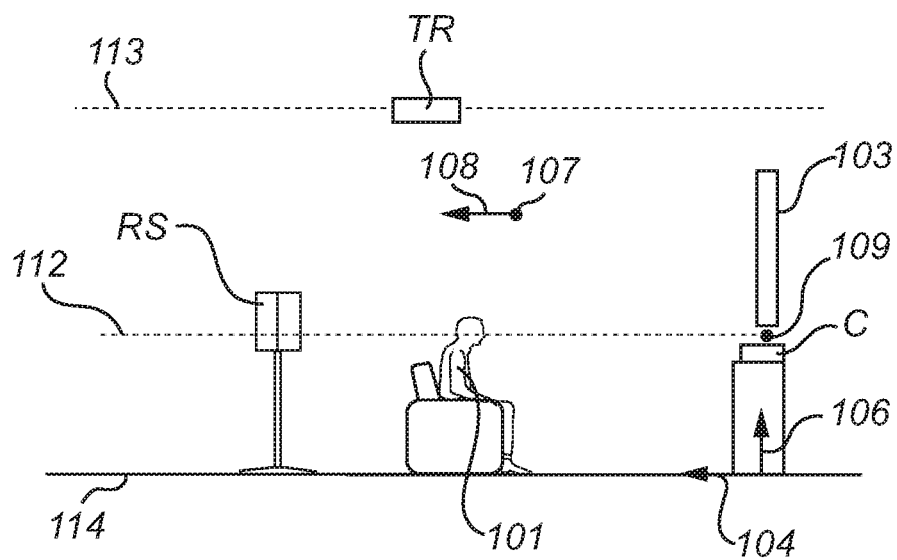
FIG. 11 is a side view of the room in FIG. 1.

FIG. 1 is a perspective view of a room with an example loudspeaker setup for reproducing an audio scene. FIG. 10 is a top view of the room in FIG. 1. FIG. 11 is a side view of the room in FIG. 1. In the present example, the listener 101 sits in a sofa 102 in the middle of the room. The listener 101 is watching a movie at a television screen 103. Loudspeakers are distributed in the room to reproduce (or convey) a three-dimensional audio scene according to a 5.1.2 loudspeaker setup. A center speaker C is located at the center just below the screen 103 in front of the listener 101. A subwoofer SW for conveying low frequency effects is also arranged below the screen 103. Left front LF and right front RF speakers are located in front of the listener 101, but at either sides of the screen 103. Left surround LS and right surround RS speakers are arranged behind the listener 101 at either side of the room. Two ceiling speakers TL and TR are also provided. The ceiling speakers TL and RL are arranged (or mounted) in the ceiling at either sides of the user 101.

It will be appreciated that the 5.1.2 speaker setup described with reference to FIGS. 1, 10 and 11 only serves as an example. Many other speaker setups may be employed to reproduce an audio scene. It will also be appreciated that an audio scene may be reproduced in other environments than a room with a TV. An audio scene may for example be reproduced at a cinema where loudspeakers are distributed to convey a three-dimensional audio scene while a movie is shown at the cinema screen.

Positions in the room (or in the audio scene to be reproduced in the room) may be defined via coordinates, for example Cartesian coordinates or spherical coordinates. The front of the audio scene is in front of the listener 101, where the screen 103 is and where the center speaker C is arranged. The front of the audio scene may for example be defined as the plane 110 in which the screen 103 is arranged. The back of the audio scene is behind the user 101, for example in a plane 111 in which the left surround LS and right surround RS speakers are arranged. If Cartesian coordinates are employed, a first coordinate 104 may define the position in the front-back direction 104, a second coordinate 105 may define the position in the left-right direction 105, and a third coordinate 106 may define the vertical position 106 (or elevation) between the floor level 114 and the ceiling 113 where the ceiling speakers TL and TR are located. In some loudspeaker setups, one or more loudspeakers may be arranged below the listener level 112 so as to convey the impression of audio objects located below the listener 101. In such loudspeaker setups, the third coordinate 106 may define the vertical position 106 (or elevation) between speakers located below the listener level 112 and ceiling speakers TL and TR located in the ceiling 113.

It will be appreciated that other coordinate systems may be employed instead of Cartesian coordinates. For example, spherical or cylindrical coordinates may be employed to define positions in the room.

Audio objects to be reproduced by the speaker system may comprise audio content and location metadata defining a position of the audio object in the audio scene. A change in the location metadata between time frames indicates that the object is moving. By using an appropriate combination of the loudspeakers to play back the audio content, an impression may be conveyed that the audio object is located at its intended position in the audio scene relative to the listener 101. An example audio object 107 is shown in FIG. 1. The audio object 107 is located to the right of the listener 101. As indicated by the arrow 108, the audio object 107 is moving backwards in the audio scene. Another example audio object 109 is also shown in FIG. 1. The audio object 109 is located at the front of the audio scene and does not move.

At least some audio formats allow for labelling of audio object types via metadata. Audio objects including dialog may therefore be labeled accordingly, so that an audio processing system (such as an encoder, a decoder, or a renderer) receiving an audio object knows whether the audio object includes dialog. However, many audio content creators do not employ this possibility to label audio objects. Therefore, audio processing systems receiving a collection of audio objects do not know which audio objects to subject to dialog enhancement. In such a situation, the processing system could refrain from performing dialog enhancement altogether. Alternatively, the processing system could analyze the audio content of each of the audio objects to determine whether the respective audio objects include dialog. Examples of ways to analyze the audio content of an audio object for classifying the audio object are spectral flux speech detection and digital signal machine learning algorithms. Examples of ways to analyze the audio content of an audio object for classifying the audio object are also provided in the documents US 2016/0078879 A1 (which is incorporated herein by reference in its entirety), US 2015/0332680 A1 (which is incorporated herein by reference in its entirety) and US 2010/0121634 A1 (which is incorporated herein by reference in its entirety), referred to above in the background section.

Such schemes for analyzing the audio content of audio objects are associated with relatively high computational complexity. As described below with reference to FIGS. 2-9, a different approach for classifying audio objects is proposed.

Knowledge of whether an audio object includes dialog may also be useful in spatial coding tools aiming to reduce the total bitrate of the audio scene by reducing the objects into clusters. Such coding tools can benefit from an understanding of the object type as it allows for object isolation during the coding process to enable listener personalization during rendering, or for the switching of dialog tracks for multiple languages after spatial encoding.

Figure 2:
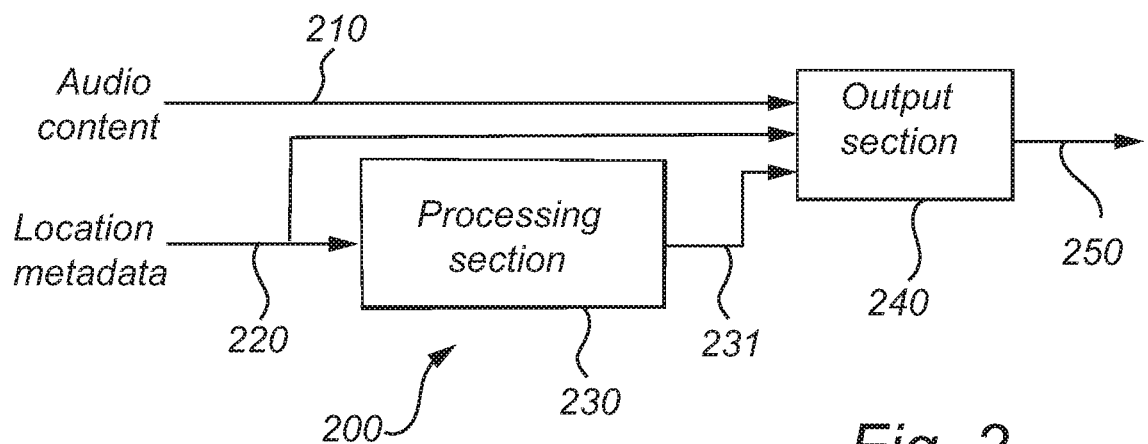
FIG. 2 shows an encoder side system for classifying audio objects based on location metadata, according to an example embodiment.

FIG. 2 shows a system 200 according to an example embodiment. In the present embodiment, an audio object has been created by a content creator. The audio object comprises audio content 210 and associated location metadata 220. The audio content 210 may for example be provided in the form of a pulse code modulated (PCM) file such as a WAV file. The location metadata 220 may for example be provided in the form of a text file.

The system 200 receives the location metadata 220 of the audio object. The system 200 comprises a processing section 230 that estimates, based on the location metadata 220, whether the audio object includes dialog. The processing section 230 assigns a value to an object type parameter 231 representative of the result of the estimation. The object type parameter 231 may then be output by the system 200 for transmission as metadata together with the audio content 210 and the location metadata 220.

In the present embodiment, the system 200 is an encoding system comprising an output section 240. The output section 240 outputs a bitstream 250 which includes the audio content 210, the location metadata 220, and the assigned value of the object type parameter 231. The output section 240 may for example employ an encoding section to encode the audio content 210 (for example in a transform domain such as a quadrature mirror filter, QMF, bank domain or a modified discrete cosine transform, MDCT, domain). The output section 240 may for example employ a multiplexer to combine the different signals into the bitstream 250. The object type parameter 231 informs a receiving audio processing system (such as a decoder or renderer) whether the audio object provided in the bitstream 250 is likely to include dialog. The object type parameter 231 may for example be indicated in the bitstream via a Boolean flag.

The object type parameter 231 may be computed in different ways. The object type parameter 231 may for example be computed based on a position of the audio object in the front-back direction y and based on its velocity v according to the following equation:

$$\text{object type parameter value} = k(1-y) + m(1-v). \quad (1)$$

In the above equation (1), the front-back direction y has been normalized such that y=0 corresponds to a position at the front 110 of the audio scene, and y=1 corresponds to a position at the back 111 of the audio scene. The front back direction y corresponds to the front-back direction 104 described above with reference to FIG. 1. The velocity v (or rather the speed since it is a scalar value) in the above equation (1) may for example be computed as a difference between the locations of the audio object in two consecutive frames according to the following equation:

$$v = \sqrt{(x_2-x_1)^2 + (y_2-y_1)^2 + (z_2-z_1)^2} \quad (2)$$

where the indices of the coordinates x, y and z denote the frame number. Similarly to the position y in the front-back direction, the velocity v may be normalized such that v=0 corresponds to the audio object being stationary, and v=1 corresponds to the audio object moving from one side of the room to another side of the room in one time frame.

It is also possible to employ a time average of velocities v from equation (2) computed for multiple frames, instead of employing v from equation (2) directly in equation (1). In other words, a sequence of velocities v may be computed via equation (2) for different time frames. The average of these speeds may then be employed as v in equation (1).

According to equation (1), the object type parameter is computed as a linear combination (or weighted sum) of the position y and the velocity v. The coefficients k and m in equation (1) are weights assigned to reflect the relevance of the position y and the velocity v for estimating a confidence level of whether an audio object includes dialog. Suitable weights to apply in equation (1) may for example be determined via mean square fitting based on test data.

Other aspects which may be included in equation (1) may for example be a level of elevation of the audio object (the vertical position 106 in FIG. 1) and/or an acceleration of the audio object (or even higher order derivatives of the location of the audio object). Audio objects located at the same level of elevation as the listener 101 (or at the same vertical position 112 as the listener 101) may be more likely to include dialog than audio objects located closer to the ceiling 113. Suitable weights to apply to the different aspects influencing the confidence level may for example be obtained via mean square fitting based on test data. Alternatively, a machine learning algorithm could be employed to generate a confidence level based on such different aspects.

The above equation (1) for computing the object type parameter reflects the fact that dialog audio objects in typical cinema mixes are often stationary (or slow moving) and are often located at the front 110 of the audio scene where the screen 103 is located.

The first example audio object 107 described above with reference to FIG. 1 would get a low value in equation (1) since it is not close to the front 110 of the audio scene and since it is moving. This indicates that the audio object 107 is not very likely to include dialog. The second example object 109 is at the front 110 of the audio scene and does not move. It would therefore get a higher value in equation (1), which indicates that is likely to include dialog.

Figure 3:
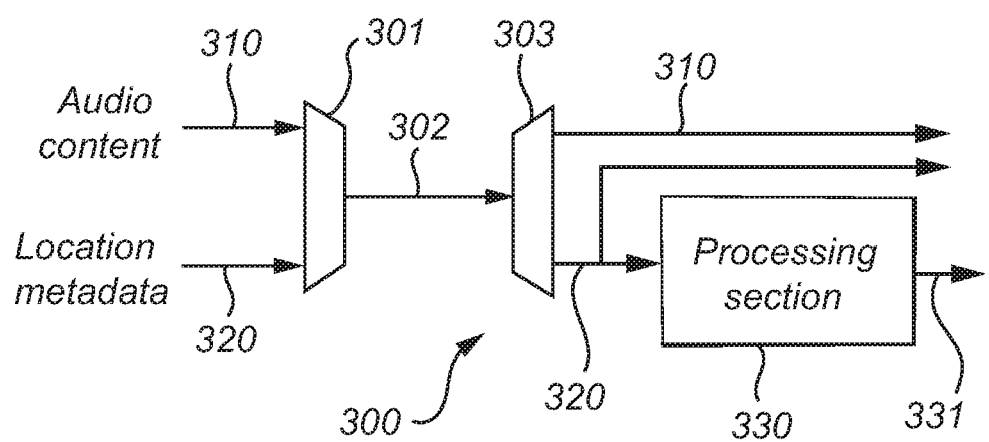
FIG. 3 shows a decoder side system for classifying audio objects based on location metadata, according to an example embodiment.

FIG. 3 shows a system 300 according to an example embodiment. Similarly to the system 200, described above with reference to FIG. 2, the system 300 receives location metadata 320 of an audio object, and a processing section 330 of the system 300 estimates (based on the location metadata 320) whether the audio object includes dialog. The processing section 330 assigns a value to an object type parameter 331 representative of the result of the estimation. The object type parameter 331 may then be output by the system 300 for transmission as metadata together with the audio content 310 and the location metadata 320 of the audio object.

In contrast to the system 200 described above with reference to FIG. 2, the system 300 is a decoding system. The audio content 310 and the location metadata 320 may have been encoded into a bitstream 302 via use of a multiplexer 301, and may be retrieved from the bitstream 302 by the system 300 via use of a demultiplexer 303. The decoding system 300 may for example provide its output to another system for further processing. The decoding system 300 may for example provide its output to a rendering system or to an audio reproduction system.

The audio objects received by the system 300 could potentially have been obtained via clustering of an original set of audio objects. Such clustering may have caused stationary dialog audio objects to be included into clusters with time-varying spatial positions. A received audio object including dialog may therefore move in the audio scene, even if dialog audio objects may typically be stationary. It may therefore be desirable to supplement the initial object type estimation provided by the processing section 330 with a refined object type estimation based on the audio content of the audio object, as described below with reference to FIGS. 4-6

Figure 4:
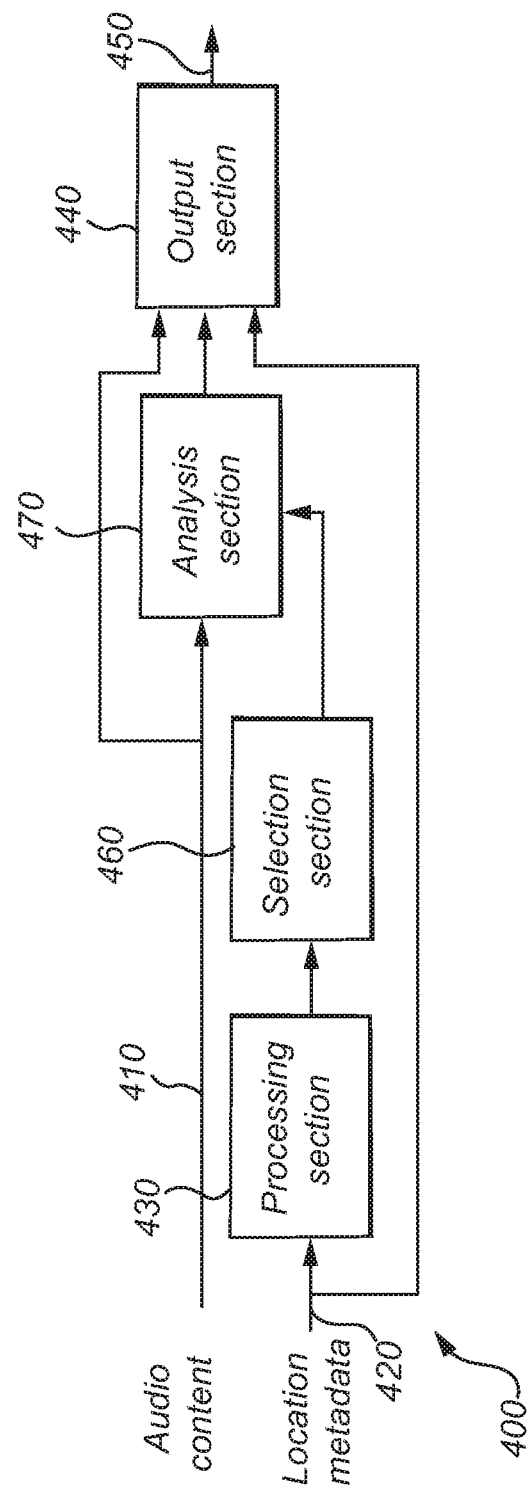
FIG. 4 shows a system for classifying audio objects based on both location metadata and audio content, according to an example embodiment.

FIG. 4 shows a system 400 according to an example embodiment. Similarly to the system 200, described above with reference top FIG. 2, the system 400 receives location metadata 420 of audio objects, and a processing section 430 of the system 400 estimates (based on the location metadata 420) whether the respective audio objects includes dialog. The processing section 430 assigns values to object type parameters representative of the results of the respective estimations.

Instead of outputting the object type parameters for transmission as metadata together with the audio content 410 and the location metadata 420 of the audio objects, the system 400 performs further processing via a selection section 460 and an analysis section 470.

The selection section 460 selects a subset of the audio objects based on the assigned values of the object type parameters. The selection section 460 applies a threshold to select the subset of the audio objects. In the present embodiment, each of the object type parameters indicates a confidence level for whether the associated audio object includes dialog. The audio objects with a confidence level above the threshold are selected by the selection section 460. If, for example, the coefficients k and m in the above equation (1) both have the value ½ and the parameters y and v are normalized to a range between 0 and 1, then the selection section 460 could for example employ the threshold value ½, ⅓, ¼ or ⅕ for the object type parameter to select audio objects.

The audio objects selected by the selection section 470 are then provided to the analysis section 470. The analysis section 470 analyzes the audio content of the selected audio objects and determines values indicating a refined level of confidence that the respective audio objects include dialog. The refined level of confidence provided by the analysis section 470 may be more reliable than the object type parameters provided by the processing section 430 since the refined confidence level is based on analysis of the actual audio content, rather than being based on the location metadata 420. On the other hand, the processing section 430 and the selection section 460 together allow the number of audio objects to be analyzed by the analysis section 470 to be reduced, whereby the overall computational complexity is reduced. Those of the audio objects not selected by the selection section 460 may for example be assigned the refined confidence value 0.

The system 400 may for example be an encoding system. An output section 440 may provide a bitstream 450 including the audio content 410, the location metadata 420 and the refined confidence levels for all of the audio objects.

Figure 5:
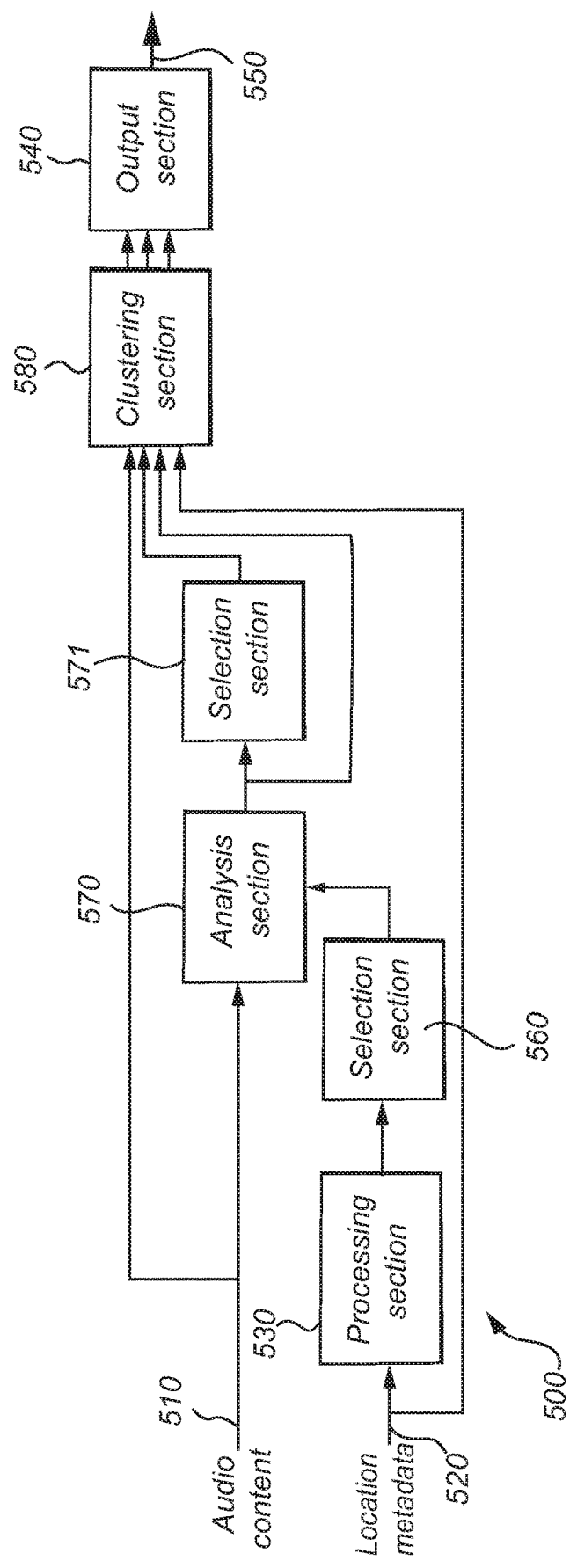
FIG. 5 shows a system for classifying audio objects and for clustering audio objects based on the audio object classification, according to an example embodiment.

FIG. 5 shows a system 500 according to an example embodiment. Similarly to the system 400, described above with reference to FIG. 4, the system 500 comprises a processing section, 530, a selection section 560, an analysis section 570 and an output section 540. However, the system 500 further comprises a second selection section 571 and a clustering section 580 which performs clustering of the audio objects before the output section includes them into a bitstream 550.

The second selection section 571 employs the refined confidence levels from the analysis section 570 to select which of the audio objects to be excluded from the clustering. While audio objects not including dialog may be clustered together to provide a more bitrate-efficient coding format, audio objects that are likely (or are believed) to include dialog may be too important for the overall audio experience to be clustered together with other audio objects. Such audio objects may therefore be excluded from the clustering by the second selection section 571.

The clustering section 580 performs clustering and provides clusters and associated metadata to the output section 540. The selected audio objects which are excluded from the clustering may for example be included in the audio bitstream together with their respective metadata.

Figure 6:
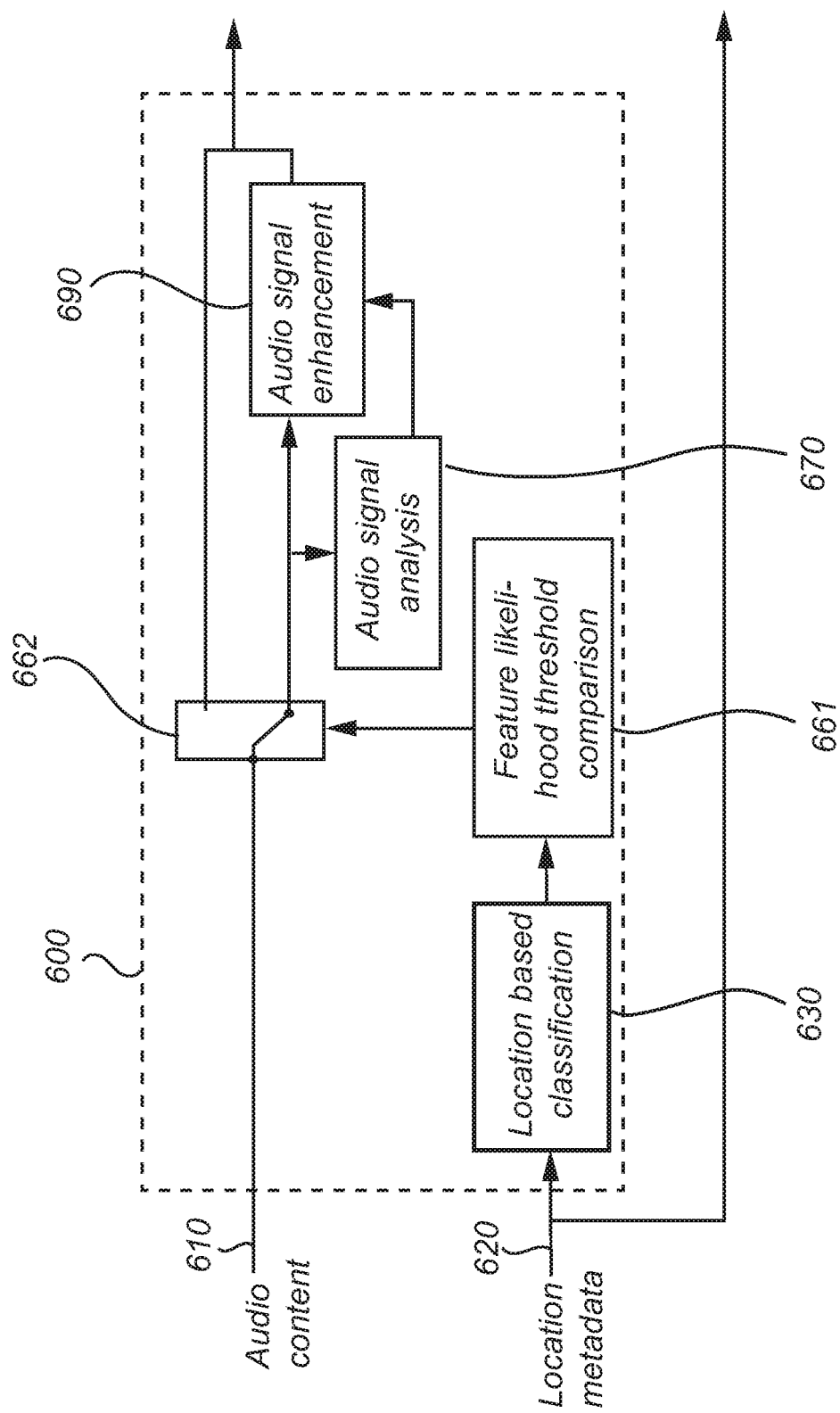
FIG. 6 shows a system for classifying audio objects and for enhancing audio signals based on the audio object classification, according to an example embodiment.

FIG. 6 shows a system 600 according to an example embodiment. The system 600 may for example be part of a decoding system or a rendering system. The system 600 receives a plurality of audio objects including audio content 610 and associated location metadata 620. The audio objects received by the system 600 may for example be the result of a clustering operation performed at an encoder side to reduce the number of bits transmitted between the encoder side and the decoder side. Therefore, dialog audio objects may have been clustered together with non-dialog audio objects, so that an audio object received by the system 600 may include a combination of dialog and other audio content. Since the dialog may he been "polluted" by other audio content, it may be desirable to perform dialog enhancement to make the dialog easier for listeners to hear and/or distinguish from the rest of the audio content.

A processing section 630 classifies the audio objects based on the location metadata. More specifically, the processing section 630 estimates, based on the location metadata 620, whether the audio object includes dialog, and assigns a value to an object type parameter based on the result of the estimation.

The value of the object type parameter is compared to a threshold in a comparator 661 such that only the audio objects most likely to contain dialog get enhanced. The output of the comparator 661 is a Boolean decision whether to allow further processing of the audio object, controlled by a switch 662. The comparator 661 and the switch 662 together act as a selection section similar to the selection sections 460 and 560 described above with reference to FIGS. 4 and 5.

If an audio object qualifies for further processing (that is, if the object type parameter is above the threshold employed by the comparator 661), the audio content 610 of that audio object is analyzed in an analysis section 670.

The analysis section 670 employs audio signal processing techniques, which may include examining the signal in the time and frequency domain to enhance the confidence of presence of dialog in the audio object. For example, if the object type parameter generated by the processing section 630 suggests that there is a high likelihood of dialogue in the audio object due to its velocity and location, then the analysis section 670 could perform a spectral flux speech detection algorithm to determine the presence of dialogue in the current time frame. The resulting output of the analysis section 670 is a multi-dimensional feature confidence score (possibly containing time varying and frequency varying confidence values) to guide the audio signal enhancement performed by a dialog enhancing section 690. The output of the dialog enhancement section 690 is an altered version of the input audio content 610 with enhancement to improve the detected dialog. The dialog enhancement may for example include that the mid-range frequency bands are boosted to improve dialogue intelligibility. The dialog enhancement section 690 may for example perform frequency-dependent processing for improving the signal to noise ratio in the respective frequency bands of the audio objects subjected to dialog enhancement.

Figure 7:
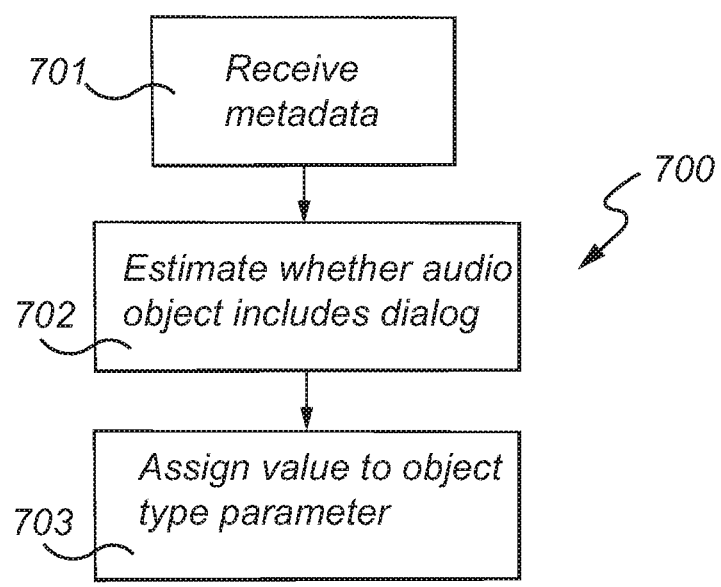
FIG. 7 is a flow chart of a method for classifying audio objects based on location metadata, according to an example embodiment.

FIG. 7 is a flow chart of a method 700 according to an embodiment. The method 700 may for example be performed by any of the systems 200-600 described above with reference to FIGS. 2-6. The method 700 comprises receiving 701 location metadata associated with an audio object, wherein the location metadata defines a position of the audio object in an audio scene, estimating 702, based on the location metadata, whether the audio object includes dialog, and assigning 703 a value to an object type parameter representative of a result of the estimation.

Figure 8:
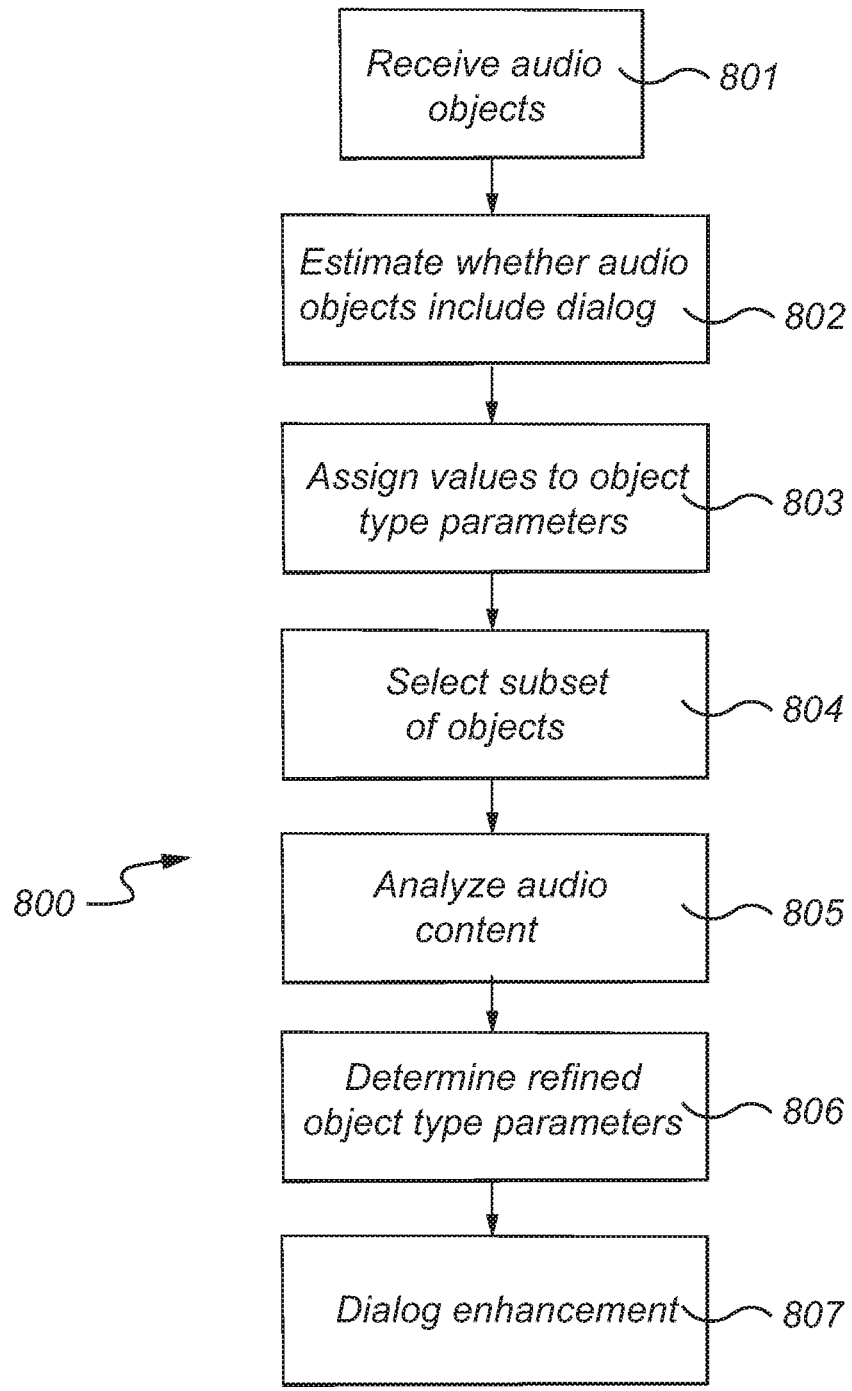
FIG. 8 is a flow chart of a method for classifying audio objects and for performing dialog enhancement based on the audio object classification, according to an example embodiment.

FIG. 8 is a flow chart of a method 800 according to an embodiment. The method 800 may for example be performed by the system 600, described above with reference to FIG. 6. The method 800 comprises receiving 801 a plurality of audio objects, estimating 802, based on the location metadata of the respective audio objects, whether the respective audio objects include dialog, assigning 803 values to object type parameters representative of results of the respective estimations, and selecting 804 a subset of the plurality of audio objects based on the assigned values of the object type parameters. For each of the one or more audio objects in the selected subset, the method 800 further comprises analyzing 805 the audio content of the audio object, determining 806, based on the analysis, a value indicating a level of confidence that the audio object includes dialog (the determined value may for example be referred to as a refined confidence level, or as a refined object type parameter), and subjecting 807 at least one audio object from the selected subset to dialog enhancement. Some audio objects may be subjected to a higher degree of dialog enhancement than other audio objects. The degree of dialog enhancement to which the at least one audio object is subjected may for example be determined based on the corresponding at least one determined refined object type parameter value.

Figure 9:
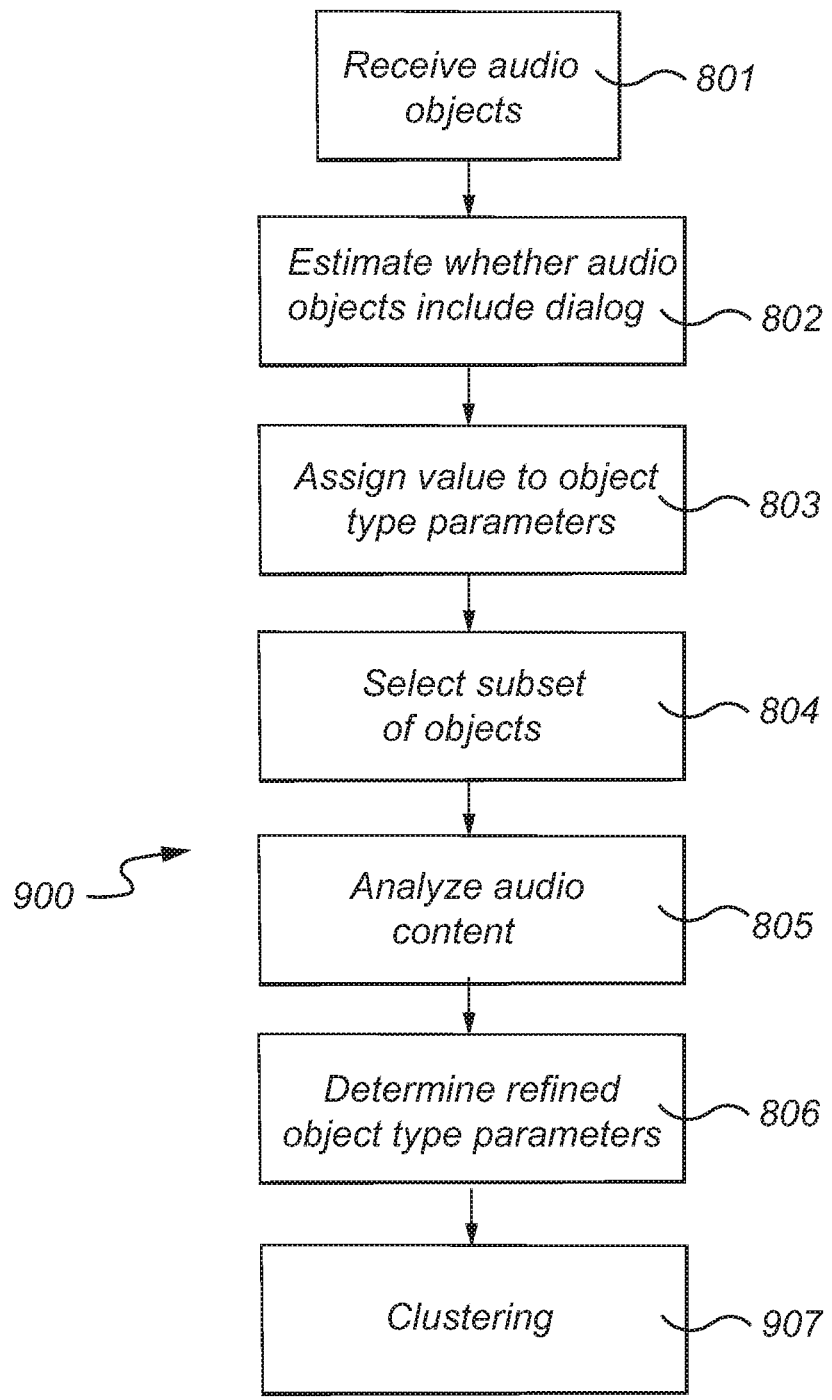
FIG. 9 is a flow chart of a method for classifying audio objects and for performing clustering based on the audio object classification, according to an example embodiment.

FIG. 9 is a flow chart of a method 900 according to an embodiment. The method 900 may for example be performed by the system 500, described above with reference to FIG. 5. The method 900 may for example include the same steps 801-806 as the method 800 described above with reference to FIG. 8, but the last step may relate to clustering 907 instead of dialog enhancement 807. More specifically, the clustering 907 may be performed based on the refined object type parameter values determined at the step 806. Audio objects with high enough refined object type parameter values may be excluded from the clustering. In other words, those audio objects believed to include dialog are excluded from the clustering, while the other audio objects are clustered together into one or more clusters.

III. EQUIVALENTS, EXTENSIONS, ALTERNATIVES AND MISCELLANEOUS

Further embodiments of the present invention will become apparent to a person skilled in the art after studying the description above. Even though the present description and drawings disclose embodiments and examples, the invention is not restricted to these specific examples. Numerous modifications and variations can be made without departing from the scope of the present invention, which is defined by the accompanying claims. Any reference signs appearing in the claims are not to be understood as limiting their scope.

Additionally, variations to the disclosed embodiments can be understood and effected by the skilled person in practicing the invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Method steps need not necessarily be performed in the order in which they appear in the claims or in the example embodiments described above, unless it is explicitly described that a certain order is required.

The devices and methods disclosed hereinabove may be implemented as software, firmware, hardware or a combination thereof. In a hardware implementation, the division of tasks between functional units referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

Various aspects of the present invention may be appreciated from the following enumerated example embodiments (EEEs):

EEE1. A method (700) comprising:
receiving (701) location metadata (210) associated with an audio object, wherein the location metadata defines a position of the audio object in an audio scene;
estimating (702), based on the location metadata, whether the audio object includes dialog; and
assigning (703) a value to an object type parameter (231) representative of a result of the estimation.

EEE2. The method of EEE 1, wherein the object type parameter:
indicates a level of confidence that the audio object includes dialog; or
is a Boolean type parameter indicating whether or not a level of confidence that the audio object includes dialog is above a threshold.

EEE3. The method of any of the preceding EEEs, wherein the estimation is performed based on a position of the audio object in a front-back direction (104) of the audio scene, the position in the front-back direction being defined by the location metadata.

EEE4. The method of EEE 3, wherein estimating whether the audio object includes dialog comprises:
associating a position (109) at a front (110) of the audio scene with a higher level of confidence that the audio object includes dialog than levels of confidence associated with positions (107) further back in the audio scene.

EEE5. The method of any of the preceding EEEs, wherein estimating whether the audio object includes dialog comprises:
computing a speed (108) of the audio object based on location metadata associated with different time frames; and
estimating, based on said speed, whether the audio object includes dialog.

EEE6. The method of EEE 5, wherein estimating whether the audio object includes dialog comprises:
associating a first value of said speed with a higher level of confidence that the audio object includes dialog than a level of confidence associated with a second value of said speed, wherein the first value of said speed is lower than the second value of said speed.

EEE7. The method of any of the preceding EEEs, wherein estimating whether the audio object includes dialog comprises:
computing an acceleration of the audio object based on location metadata associated with different time frames; and
estimating, based on said acceleration, whether the audio object includes dialog.

EEE8. The method of any of the preceding EEEs, wherein the estimation is performed based on a level of elevation (106) of the audio object defined by the location metadata.

EEE9. The method of EEE 8, wherein estimating whether the audio object includes dialog comprises:
associating a first level of elevation of the audio object with a higher level of confidence that the audio object includes dialog than levels of confidence associated with other levels of elevation of the audio object, wherein the first level of elevation corresponds to a floor level (114) of the audio scene or a vertical position (112) of an intended listener (101).

EEE10. The method (800) of any of the preceding EEEs, comprising:
receiving (801) a plurality of audio objects, each of the received audio objects including audio content (610) and location metadata (620), wherein the location metadata of an audio object defines a position of that audio object in an audio scene;
estimating (802), based on the location metadata of the respective audio objects, whether the respective audio objects include dialog;
assigning (803) values to object type parameters representative of results of the respective estimations; and
selecting (804) a subset of the plurality of audio objects based on the assigned values of the object type parameters, wherein the subset includes one or more audio objects.

EEE11. The method of EEE 10, wherein the assigned value for each of the object type parameters indicates a level of confidence that the corresponding audio object includes dialog, and wherein selecting a subset of the plurality of audio objects comprises:
selecting those one or more audio objects for which the level of confidence that the corresponding audio object includes dialog is above a threshold.

EEE12. The method of any of EEEs 10-11, further comprising:
subjecting (807) at least one audio object in the selected subset to dialog enhancement.

EEE13. The method (900) of any of EEEs 10-12, further comprising performing clustering (907) such that the audio content from those of the plurality of audio objects outside the selected subset is included in a collection of clusters and such that:
at least one audio object of the selected subset is excluded from the clustering; or
the audio content of at least one audio object of the selected subset is included in a cluster which does not include audio content from any of those of the plurality of audio objects outside the selected subset.

EEE14. The method of any of EEEs 10-13, further comprising, for each of the one or more audio objects in the selected subset:
analyzing (805) the audio content of the audio object; and
determining (806), based on said analysis, a value indicating a level of confidence that the audio object includes dialog.

EEE15. The method (800) of EEE 14, comprising:
subjecting (807) at least one audio object from the selected subset to dialog enhancement, wherein a degree of dialog enhancement to which said at least one audio object is subjected is determined based on the corresponding at least one determined value.

EEE16. The method (800) of any of EEEs 14-15, wherein the selected subset includes multiple audio objects, the method comprising:
selecting at least one audio object from the selected subset based on the determined values; and
subjecting (807) the selected at least one audio object to dialog enhancement.

EEE17. The method (900) of any of EEEs 14-16, wherein the selected subset includes multiple audio objects, the method comprising:
selecting at least one audio object from the selected subset based on the determined values; and
performing (907) the clustering such that the audio content from those of the plurality of audio objects outside the selected at least one audio object is included in a collection of clusters,
wherein the clustering is performed such that:
the at least one selected audio object is excluded from the clustering; or the audio content of the at least one selected audio object is included in a cluster which does not include audio content from any of those of the plurality of audio objects outside the at least one selected audio object.

EEE18. A computer program product comprising a computer-readable medium with instructions for performing the method of any of EEEs 1-17.

EEE19. A system (200) configured to receive location metadata (220) associated with an audio object, wherein the location metadata defines a position of the audio object in an audio scene, the system comprising:

a processing section (230) configured to estimate, based on the location metadata, whether the audio object includes dialog, and to assign a value to an object type parameter (231) representative of a result of the estimation.

EEE20. The system (400, 500, 600) of EEE 19, wherein the system is configured to receive a plurality of audio objects, each of the audio objects including audio content (410, 510, 610) and location metadata (420, 520, 620), wherein the location metadata of an audio object defines a position of that audio object in an audio scene, and wherein the processing section (430, 530, 630) is configured to:

estimate, based on the respective location metadata, whether the respective audio objects include dialog; and assign values to object type parameters representative of results of the respective estimations, the system further comprising:

a selection section (460, 560, 661, 662) configured to select a subset of the plurality of audio objects based on the assigned values of the object type parameters, wherein the subset includes one or more audio objects.

EEE21. The system of EEE 20, further comprising:

a dialog enhancement section (690) configured to subject at least one audio object in the selected subset to dialog enhancement.

EEE22. The system of any of EEEs 20-21, further comprising a clustering section (580) configured to perform clustering such that the audio content from those of the plurality of audio objects outside the selected subset is included in a collection of clusters and such that:

at least one audio object of the selected subset is excluded from the clustering; or the audio content of at least one audio object of the selected subset is included in a cluster which does not include audio content from any of those of the plurality of audio objects outside the selected subset.

EEE23. The system of any of EEEs 20-22, further comprising an analysis section (470, 570, 670) configured to, for each of the one or more audio objects in the selected subset:

analyze the audio content of the audio object; and determine, based on said analysis, a value indicating a level of confidence that the audio object includes dialog.

EEE24. The system of EEE 23, wherein the system comprises:

a dialog enhancement section (690) configured to subject at least one audio object in the selected subset to dialog enhancement, wherein the dialog enhancement section is configured to determine a degree of dialog enhancement to which to subject said at least one audio object based on the corresponding at least one determined value.

EEE25. The system of any of EEEs 23-24, wherein the system comprises:

a dialog enhancement section (690) configured to subject at least one audio object in the selected subset to dialog enhancement, wherein the selected subset includes multiple audio objects, and wherein the at least one audio object to be subjected to dialog enhancement is selected based on the determined values.

EEE26. The system of any of EEEs 23-24, wherein the selected subset includes multiple audio objects, the system further comprising:

a second selection section (571) configured to select at least one audio object from the selected subset based on the determined values, wherein a clustering section (580) is configured to perform clustering such that the audio content from those of the plurality of audio objects outside the selected at least one audio object is included in a collection of clusters, and wherein the clustering section is configured to perform the clustering such that:

the at least one selected audio object is excluded from the clustering; or the audio content of the at least one selected audio object is included in a cluster which does not include audio content from any of those of the plurality of audio objects outside the at least one selected audio object.

The invention claimed is:

1. A method comprising:

receiving location metadata associated with an audio object, wherein the location metadata defines a position of the audio object in an audio scene;

estimating, based on the location metadata, whether the audio object includes dialog; and assigning a value to an object type parameter representative of a result of the estimation, wherein estimating whether the audio object includes dialog comprises:

computing a speed of the audio object based on location metadata associated with different time frames; and estimating, based on said speed, whether the audio object includes dialog.

2. The method of claim 1, wherein the object type parameter:

indicates a level of confidence that the audio object includes dialog; or is a Boolean type parameter indicating whether or not a level of confidence that the audio object includes dialog is above a threshold.

3. The method of claim 1, wherein the estimation is performed based on a position of the audio object in a front-back direction of the audio scene, the position in the front-back direction being defined by the location metadata.

4. The method of claim 3, wherein estimating whether the audio object includes dialog comprises:

associating a position at a front of the audio scene with a higher level of confidence that the audio object includes dialog than levels of confidence associated with positions further back in the audio scene.

5. The method of claim 1, wherein estimating whether the audio object includes dialog comprises:

associating a first value of said speed with a higher level of confidence that the audio object includes dialog than a level of confidence associated with a second value of said speed, wherein the first value of said speed is lower than the second value of said speed.

6. The method of claim 1, wherein the estimation is performed based on a level of elevation of the audio object defined by the location metadata.

7. The method of claim 6, wherein estimating whether the audio object includes dialog comprises:

associating a first level of elevation of the audio object with a higher level of confidence that the audio object includes dialog than levels of confidence associated with other levels of elevation of the audio object, wherein the first level of elevation corresponds to a floor level of the audio scene or a vertical position of an intended listener.

8. The method of claim 1, comprising:
receiving a plurality of audio objects, each of the received audio objects including audio content and location metadata, wherein the location metadata of an audio object defines a position of that audio object in an audio scene;
estimating, based on the location metadata of the respective audio objects, whether the respective audio objects include dialog;
assigning values to object type parameters representative of results of the respective estimations; and
selecting a subset of the plurality of audio objects based on the assigned values of the object type parameters, wherein the subset includes one or more audio objects.

9. The method of claim 8, further comprising:
subjecting at least one audio object in the selected subset to dialog enhancement; and/or
performing clustering such that the audio content from those of the plurality of audio objects outside the selected subset is included in a collection of clusters and such that:
at least one audio object of the selected subset is excluded from the clustering; or
the audio content of at least one audio object of the selected subset is included in a cluster which does not include audio content from any of those of the plurality of audio objects outside the selected subset.

10. The method of claim 8, further comprising, for each of the one or more audio objects in the selected subset:
analyzing the audio content of the audio object; and
determining, based on said analysis, a value indicating a level of confidence that the audio object includes dialog.

11. The method of claim 10, comprising:
subjecting at least one audio object from the selected subset to dialog enhancement, wherein a degree of dialog enhancement to which said at least one audio object is subjected is determined based on the corresponding at least one determined value.

12. The method of claim 10, wherein the selected subset includes multiple audio objects, the method comprising:
selecting at least one audio object from the selected subset based on the determined values; and
subjecting the selected at least one audio object to dialog enhancement and/or performing clustering such that the audio content from those of the plurality of audio objects outside the selected at least one audio object is included in a collection of clusters, wherein the clustering is performed such that:
the at least one selected audio object is excluded from the clustering; or
the audio content of the at least one selected audio object is included in a cluster which does not include audio content from any of those of the plurality of audio objects outside the at least one selected audio object.

13. A computer program product comprising a non-transitory computer-readable medium with instructions, which when executed by one or more processors of an electronic device, cause the device to perform the steps of:
receiving location metadata associated with an audio object, wherein the location metadata defines a position of the audio object in an audio scene;
estimating, based on the location metadata, whether the audio object includes dialog; and
assigning a value to an object type parameter representative of a result of the estimation, wherein estimating whether the audio object includes dialog comprises:
computing a speed of the audio object based on location metadata associated with different time frames; and
estimating, based on said speed, whether the audio object includes dialog.

14. A system configured to receive location metadata associated with an audio object, wherein the location metadata defines a position of the audio object in an audio scene, the system comprising:
a processor configured to perform the following:
estimating, based on the location metadata, whether the audio object includes dialog, and
assigning a value to an object type parameter representative of a result of the estimation,
wherein estimating whether the audio object includes dialog comprises:
computing a speed of the audio object based on location metadata associated with different time frames; and
estimating, based on said speed, whether the audio object includes dialog.

* * * * *